United States Patent
Miyoshi

(10) Patent No.: US 9,137,581 B2
(45) Date of Patent: Sep. 15, 2015

(54) VIDEO RECORDING/PLAYING DEVICE AND PROGRAM SEARCHING METHOD

(71) Applicant: Funai Electric Co., Ltd., Osaka (JP)

(72) Inventor: Masatoshi Miyoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 23 days.

(21) Appl. No.: 14/037,888

(22) Filed: Sep. 26, 2013

(65) Prior Publication Data

US 2014/0101703 A1 Apr. 10, 2014

(30) Foreign Application Priority Data

Oct. 4, 2012 (JP) ................................ 2012-222483

(51) Int. Cl.

| G06F 3/00 | (2006.01) |
|---|---|
| G06F 13/00 | (2006.01) |
| H04N 5/445 | (2011.01) |
| H04N 21/482 | (2011.01) |
| H04N 21/466 | (2011.01) |

(52) U.S. Cl.
CPC ....... *H04N 21/4828* (2013.01); *H04N 21/4668* (2013.01); *H04N 21/4826* (2013.01)

(58) Field of Classification Search
USPC .......................................... 725/46, 48, 49, 53
See application file for complete search history.

(56) References Cited

U.S. PATENT DOCUMENTS

| 2012/0254917 A1* | 10/2012 | Burkitt et al. ................... 725/40 |
| 2013/0074109 A1* | 3/2013 | Skelton et al. .................. 725/14 |

FOREIGN PATENT DOCUMENTS

JP 2010-028585 A 2/2010

* cited by examiner

*Primary Examiner* — Pankaj Kumar
*Assistant Examiner* — Charles N Hicks
(74) *Attorney, Agent, or Firm* — Osha Liang LLP

(57) ABSTRACT

A video recording/playing device includes a trending word acquiring portion that acquires, from the Internet, a trending word for which a search frequency is rising, and a program information searching portion that searches a program information database for program information that includes the trending word.

20 Claims, 14 Drawing Sheets

FIG. 4

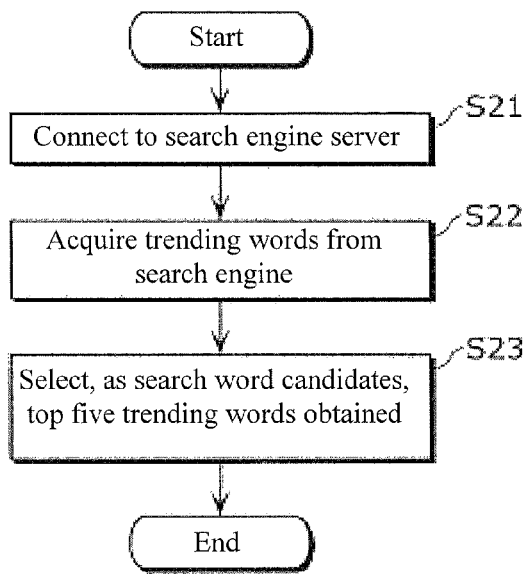

FIG. 5

| Trending Word | Explanation |
|---|---|
| Marmoset | Type of monkey. Baby on display at zoo in eastern Germany. |
| London Olympics | 30th Summer Olympics, held in London England from July 27 to August 12, 2012. |
| Typhoon No. 14 | Largest Typhoon reaching Japan this season. |
| Nippon Party | Political party with a high likelihood of becoming the ruling party in the next term. |
| Presidential Election | Election scheduled to select president of the Nippon Party Presidential Election. |

FIG. 7

| Program ID | | P1 | P2 | ... |
|---|---|---|---|---|
| Program Name | | Politics Now | Hard Luck Notebook | ... |
| Channel | | 3 | 4 | ... |
| Broadcast Date and Time | | 9/14 12:00 -12:55 | 9/14 12:00 - 13:00 | ... |
| Program Description | Program Content | Joint press conference of Nippon Party presidential election candidates | Osaka Gourmet Report | ... |
| | Genre | Politics | Variety | ... |
| | Starring | Diet Member A, Diet Member B | Talkshow Host C, Talkshow Host D | ... |

FIG. 8

| Word | Period 1 Appearance Frequency | Period 2 Appearance Frequency | Rate of Increase (%) |
|---|---|---|---|
| Politics | 5 | 5 | 0 |
| Nippon Party | 2 | 6 | 200 |
| Presidential Election | 2 | 10 | 400 |
| Press Conference | 20 | 25 | 25 |
| Hard Luck | 3 | 2 | -33 |
| Notebook | 1 | 0 | -100 |
| Osaka | 10 | 11 | 10 |
| Gourmet Report | 0 | 2 | 50 |
| ... | ... | ... | ... |
| AAA | 10 | 11 | 10 |

FIG. 9

| |
|---|
| Presidential Election |
| Nippon Party |
| Gourmet Report |
| Press Conference |
| Osaka |

FIG. 15

| Trending Word | Explanation |
|---|---|
| Marmoset | Type of monkey. Baby on display at zoo in eastern Germany. |
| London Olympics | 30th Summer Olympics, held in London England from July 27 to August 12, 2012. |
| Typhoon No. 14 | Largest Typhoon reaching Japan this season. |
| Nippon Party | Political party with a high likelihood of becoming the ruling party in the next term. |
| Presidential Election | Election scheduled to select president of the Nippon Party Presidential Election. |
| Right of Collective Self-Defense | Mayor of City X says "Obviously, if I have the authority, I am going to use it." |
| ... | ... |
| Vii W | A family game console scheduled for release this winter. |

FIG. 16

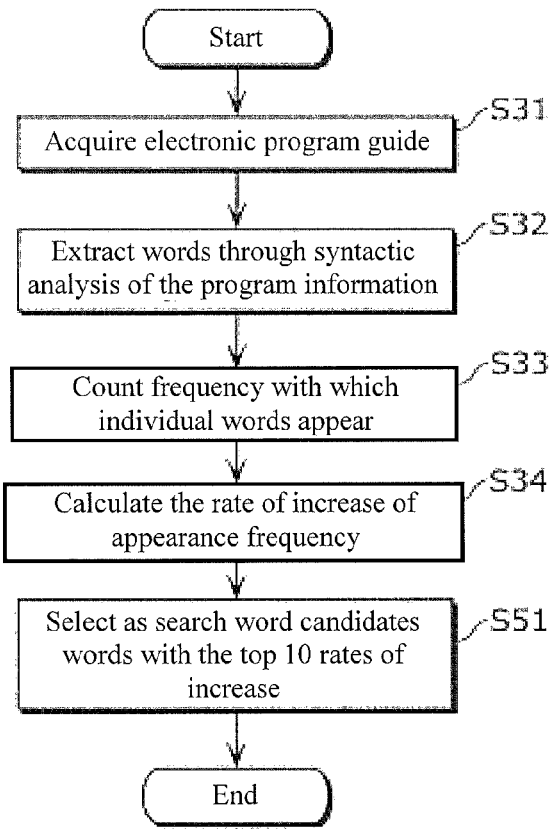

VIDEO RECORDING/PLAYING DEVICE AND PROGRAM SEARCHING METHOD

FIELD OF TECHNOLOGY

The present invention relates generally to a video recording/playing device and program searching method for searching for a program, such as a television program, and, in particular, to a video recording/playing device and program searching method for searching for a program that has been recorded in the video recording/playing device or for a program that is scheduled to be broadcasted in the future.

BACKGROUND ART

In recent years the rising popularity of video recording/playing devices, such as hard disk recorders, have made it possible for a user to record programs, such as television programs, easily. For example, video recording/playing devices able to record one week's worth of programs on all channels have appeared on the market. Moreover, electronic program guides (EPGs), which are listings of programs that are scheduled to be broadcast in the future, can be obtained through broadcasts.

Conventionally, an information processing device that is able to provide to the user, from the large number of programs, those programs that would be of interest of the user has been proposed (referencing, for example, Patent Citation 1). In this information processing device, programs that would be of interest the user are retrieved based on the rate of change, in respect to time, of word frequencies of words that appear in the EPG.

PATENT CITATION

[Patent Citation 1] Japanese Unexamined Patent Application Publication 2010-28585

However, because programs are produced by broadcasting stations, the programs that are broadcasted, and the contents of those programs, reflect the intentions of the program producers. Because of this, just because there are changes in word frequencies in EPGs does not necessarily mean that the program related to those words word will be of interest to the viewer and there are cases wherein there are discrepancies, between the program producers and the users, such as viewers, regarding interest in the program. Because of this, programs that deal with information that is of current popular interest cannot always be identified from EPGs alone.

SUMMARY OF THE INVENTION

One or more embodiments of the present invention provide a video recording/playing device and program searching method able to retrieve efficiently and with high accuracy programs dealing with information on topics of current popular interest.

A video recording/playing device according to one aspect of the present invention may comprise: a trending word acquiring portion that acquires, from the Internet, a trending word for which a search frequency is rising; and a program information searching portion that searches a program information database for program information that includes the trending word.

In one or more embodiments, program information may be searched based on trending words obtained from the Internet. A "trending" word may be a word with a high search frequency or a word where in the rate of increase, with respect to time, of the search frequency is high. Because of this, a trending word may indicate information that is of current popular interest. Consequently, searching for program information based on trending words could enable accurate and efficient retrieval of programs that deal with information regarding topics of current popular interest.

Program information for programs that have been recorded may be stored in a program information database.

One or more embodiments may enable accurate and efficient searching of program information for programs that have been recorded for programs that deal with information regarding topics of current popular interest.

In one or more embodiments, an electronic program guide obtained from a broadcast may be stored in the program information database.

One or more embodiments may enable accurate and efficient searching of electronic program guides for programs that deal with information regarding topics of current popular interest.

In one or more embodiments, the trending word acquiring portion may acquire, from the Internet, a specific number of trending words with the highest rankings.

In one or more embodiments, the video recording/playing device may further comprise a search word selecting portion that displays on a screen, as a search word candidate, the trending word acquired by the trending word acquiring portion, and that receives a selection input of a search word from a user, wherein: the program information searching portion searches the program information database for program information that includes the search word selected by the user.

In one or more embodiments, the video recording/playing device may further comprise: an attention word acquiring portion that extracts words from the electronic program guide and acquires, as an attention word, a word for which an appearance frequency in a second period, following a first period, has increased beyond the appearance frequency in the first period; and a search word selecting portion that displays on a screen, as a search word candidate, a word obtain by causing the attention word acquired by the attention word acquiring portion to operate on the trending word acquired by the trending word acquiring portion, and that receives a selection input for a search word by the user, wherein: the program information searching portion searches the program information database for program information that includes the search word selected by the user.

One or more embodiments may enable the retrieval of a program considering attention words, which are words with frequencies of appearance in the electronic program guide that are increasing over time. While attention words can be considered to reflect information that is given attention by the program producers, the use of attention words as supplementary words for trending words may enable accurate and efficient retrieval of programs that deal with information regarding topics of current popular interest.

For example, the attention word acquiring portion may acquire, as an attention word, from among the words extracted from the electronic program guide, a word having a rate of increase in an appearance frequency over an interval from the first period to the second period, relative to the appearance frequency in the first period, is no less than a specific threshold value, or a specific number of words in which the rate is large.

One or more embodiments may enable the accurate and efficient retrieval of programs that, although not given much attention during the first period, were suddenly given attention during the second period, thereafter.

In one or more embodiments, the search word selecting portion may display on the screen, as a search word candidate, a word that is included in both the trending word acquired by the trending word acquiring portion and the attention word acquired by the attention word acquiring portion.

In one or more embodiments, candidates for search words may be those that are found in both the trending words and the attention words. Because of this, the candidates for search words can be narrowed in on words that are of current popular interest and that have the attention of the program producers. Providing, to the user, search word candidates that consider the words that are paid attention to by program producers in this way, may enable an increase in the probability that a program will be found when performing a program search. Consequently, this may enable accurate and efficient retrieval of programs that deal with information regarding topics of current popular interest.

In one or more embodiments, the search word selecting portion may display on the screen, as search word candidates, the trending word acquired by the trending word acquiring portion and the attention word acquired by the attention word acquiring portion.

In one or more embodiments, the search word candidates may be both the trending words and the attention words. That is, words that are included in the attention words but not included in the trending words can be provided to the user as search word candidates. Just because a word is a trending word does not necessarily mean that there is a program that is broadcasted pertaining thereto. Because of this, the supplemental use of attention words may enable accurate and efficient retrieval of programs that deal with information regarding topics of current popular interest, while preventing omission of search words.

In one or more embodiments, the search word selecting portion may display on the screen, as search word candidates, words wherein the attention word acquired by the attention word acquiring portion has been excluded from the trending word acquired by the trending word acquiring portion.

In one or more embodiments, the search word candidates may be words wherein the attention words have been excluded from the trending words. Because of attention words can be considered to reflect the interests of the program producers, the interests of the program producers may be removed intentionally.

In one or more embodiments, the search word selecting portion may display, on the screen, the search word candidates, not including a specific or predetermined word.

For example, because a news program is a program that is broadcasted every day, when "news" is included in the search words, a variety of news programs will be retrieved. However, such words cannot really be considered to be topics of current popular interest. Because of this, it is possible to provide to the user search word candidates of high current popular interest through excluding, as specific words, words that appear frequently in program information such as "news," "starring," "information," and the like, from the search word candidates. This may enable accurate and efficient retrieval of programs that deal with information regarding topics of current popular interest.

In one or more embodiments, the search word selecting portion may further increase the number of search word candidates by increasing a number of trending words acquired by the trending word acquiring portion if the number of program information retrieved by the program information searching portion is no more than a specific program count threshold.

One or more embodiments can increase the number of search word candidates when there are no programs that deal with the content of the search words. As a result, it is possible to prevent the omission of retrieval of programs dealing with topics of current popular interest through enabling the selection of search words by the user.

In one or more embodiments, the search word selecting portion may further increase the number of search word candidates by increasing a number of attention words acquired by the attention word acquiring portion, and by decreasing the specific threshold value or by increasing the specific number, if the number of program information retrieved by the program information searching portion is no more than a specific program count threshold.

One or more embodiments can increase the number of search word candidates when there are no programs that deal with the content of the search words. As a result, it is possible to prevent the omission of retrieval of programs dealing with topics of current popular interest through enabling the selection of search words by the user.

In one or more embodiments, the program information may include program names and program descriptions.

One or more embodiments may enable searching of program information that includes search words, in not just program names, but program descriptions as well.

The present invention may be embodied not only as a video recording/playing device provided with the distinctive processing portions set forth above, but also as a program searching method that has, as steps, the procedures that are executed by the distinctive processing portions that are included in the video recording/playing device. Moreover, it may also be embodied as a program for causing a computer to execute the distinctive steps that are included in the program searching method or a program for causing a computer to function as the distinctive processing portion that is included in the video recording/playing device. Moreover, this program, of course, may be distributed via a computer-readable non-volatile storage medium, such as a CD-ROM (Compact Disc-Read Only Memory), or through a communication network such as the Internet.

One or more embodiments of the present invention provide a video recording/playing device and a program searching method that may enable accurate and efficient retrieval of programs that deal with information regarding topics of current popular interest.

BRIEF DESCRIPTIONS OF THE DRAWINGS

FIG. 4 is a detailed flowchart for the trending word acquiring procedure (S1 in FIG. 3).

FIG. 5 is a diagram illustrating one example of five selected trending words.

FIG. 7 is a diagram illustrating an example of an electronic program guide.

FIG. 8 is a diagram illustrating one example of appearance frequencies of words that are counted.

FIG. 9 is a diagram illustrating one example of five attention words that are selected as search word candidates.

FIG. 15 is a diagram illustrating one example of a selected portion from 10 trending words.

FIG. 16 is a detailed flowchart for the attention word repeated acquiring procedure (S9 in FIG. 2).

DETAILED DESCRIPTION OF THE INVENTION

Embodiments of the present invention will be explained in detail below using the drawings. The embodiments explained below each illustrate examples of the present invention. The quantitative values, shapes, materials, structural elements, arrangement positions and forms of connections between the structural elements, steps, step sequences, and the like, given in the embodiments set forth below, are all merely examples, and are not intended to limit the present invention. The present invention is specified by the Scope of Patent Claims. Consequently, of the structural elements in the embodiments set forth below, those structural elements that are not described in the independent claims are not absolutely necessary in achieving the present invention, but rather are explained for purposes of illustration.

Figure 1:
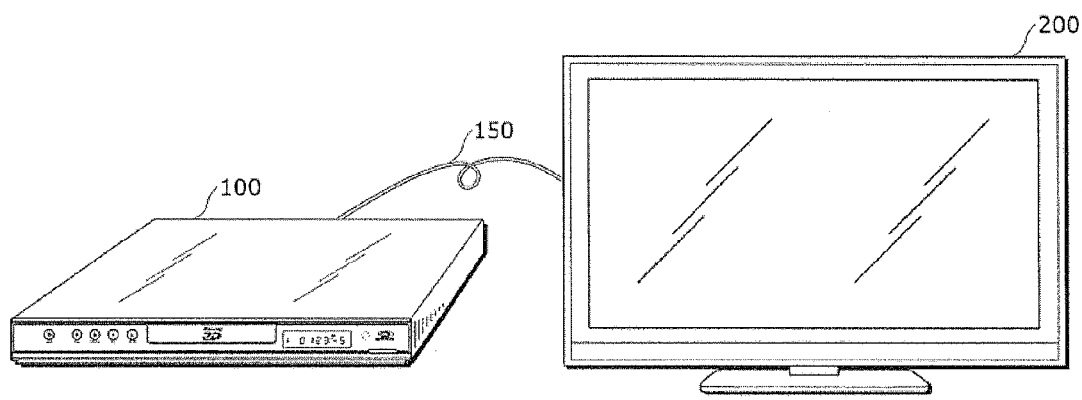
FIG. 1 is an external view of a video recording/playing device according to one or more embodiments of the present invention, and of a television that is connected to the video recording/playing device.

FIG. 1 is an external view of a video recording/playing device according to one or more embodiments of the present invention, and of a television that is connected to the video recording/playing device.

The video recording/playing device 100 is, for example, a hard disk recorder or BD (Blu-ray Disc™) recorder, or the like, for recording television programs. The video recording/playing device 100 searches programs that are recorded on the video recording/playing device 100, or programs that are scheduled to be broadcasted in the future.

The television 200 displays programs that are recorded on the video recording/playing device 100.

The video recording/playing device 100 is connected to the television 200 through a cable 150.

Figure 2:
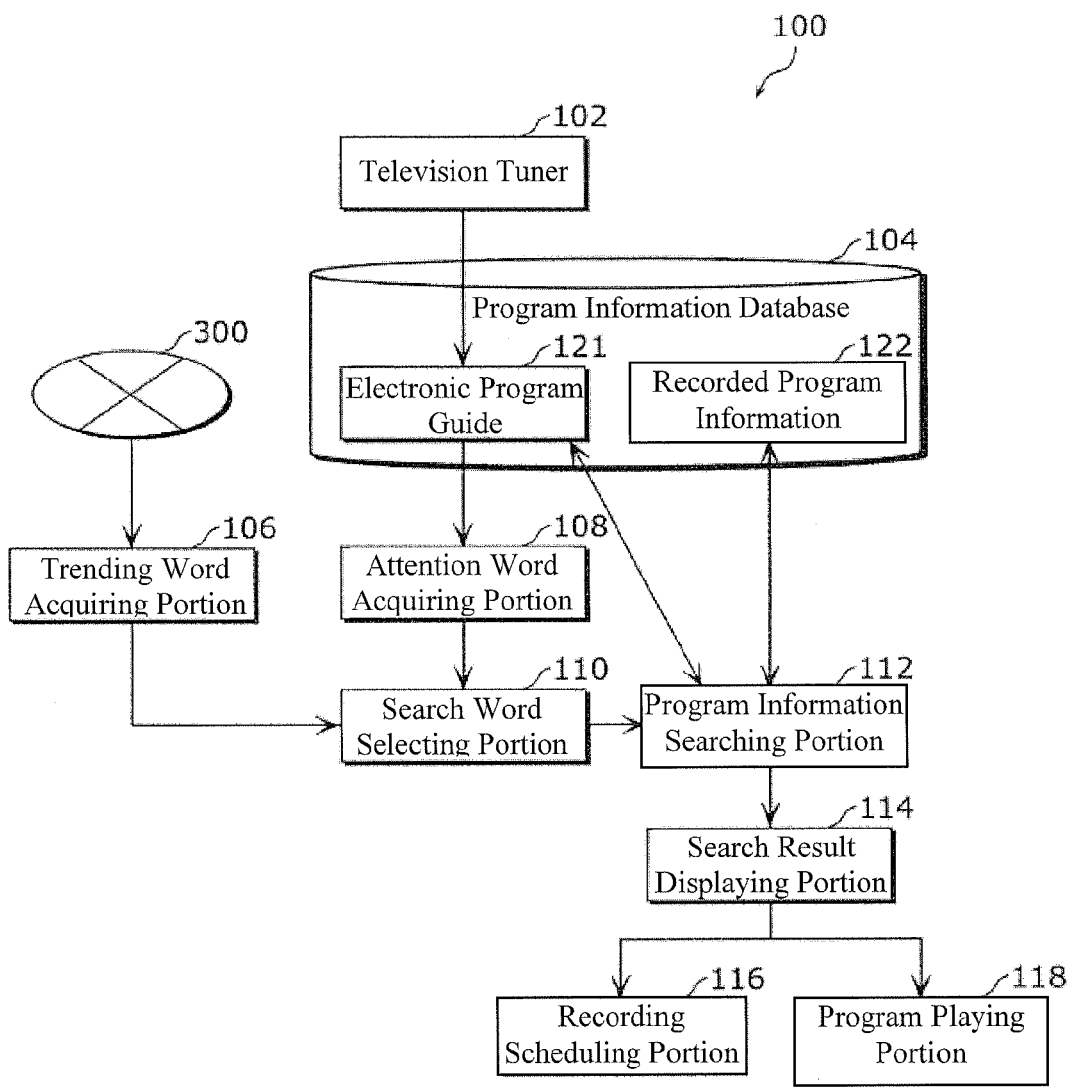
FIG. 2 is a block diagram illustrating a functional structure of the video recording/playing device.

FIG. 2 is a block diagram illustrating the functional structure of the video recording/playing device 100 according to one or more embodiments.

The video recording/playing device 100 includes: a television tuner 102, a program information database 104, a trending word acquiring portion 106, an attention word acquiring portion 108, a search word selecting portion 110, a program information searching portion 112, a search result the displaying portion 114, a recording scheduling portion 116, and a program playing portion 118.

The television tuner 102 receives television broadcasts and electronic program guides included in television broadcasts.

The program information database 104 stores electronic program guides 121 that are received by the television tuner 102, and recorded program information 122 that is program information for programs that have already been recorded, from the programs included in the television broadcasts received by the television tuner 102. The program information database 104 is structured from, for example, a hard disk drive. The electronic program guide 121 is the most recent electronic program guide 121 and includes, for each program, program information relating to programs that are currently being broadcasted and program information for programs that are scheduled to be broadcasted in the future. The most recent electronic program guide 121 can used to accurate and efficient searching of electronic program guides for the most recent programs that deal with information regarding topics of current popular interest. The recorded program information 122 is program information that is recorded together with the program when a program is recorded.

The trending word acquiring portion 106 is connected to the Internet 300, and acquires trending words, which are words for which the number of searches on a search engine is increasing, from the Internet 300. Trending words indicate information that has become the topic of current public interest. A search engine is a program or a website for providing an information search service on the Internet. The trending word acquiring portion 106 may acquire trending words from a search engine or from another website.

The attention word acquiring portion 108 extracts words from the electronic program guide 121 that is stored in the program information database 104, and, from those, acquires, as attention words, words wherein the appearance frequencies in a second period, which follows a first period, have increased beyond the appearance frequencies in the period. The attention words can be considered to reflect information to which the program producers pay attention.

The search word selecting portion 110 displays, as search word candidates, on the screen of the television 200, the trending words acquired by the trending word acquiring portion 106, to receive a search word selection input from the user. Moreover, the search word selecting portion 110 displays, as search word candidates, on the screen of the television 200, the attention words acquired by the attention word acquiring portion 108, to receive a search word selection input from the user.

The program information searching portion 112 searches the program information database 104, which stores the electronic program guide 121 and the recorded program information 122 for program information that includes trending words. More specifically, the program information searching portion 112 searches the program information database 104 for program information that includes a search word selected by the user.

The search result displaying portion 114 displays, on the screen of the television 200, the program information retrieved by the program information searching portion 112.

The recording scheduling portion 116 schedules recording of a program having program information selected by the user from the program information displayed on the screen of the television 200 when the program information searching portion 112 has retrieved program information from the electronic program guide 121.

The program playing portion 118 plays a program having program information selected by the user from the program information displayed on the screen of the television 200 when the program information searching portion 112 has retrieved program information from the recorded program information 122.

The procedures executed by the video recording/playing device 100, structured as set forth above, will be explained below using specific examples.

Figure 3:
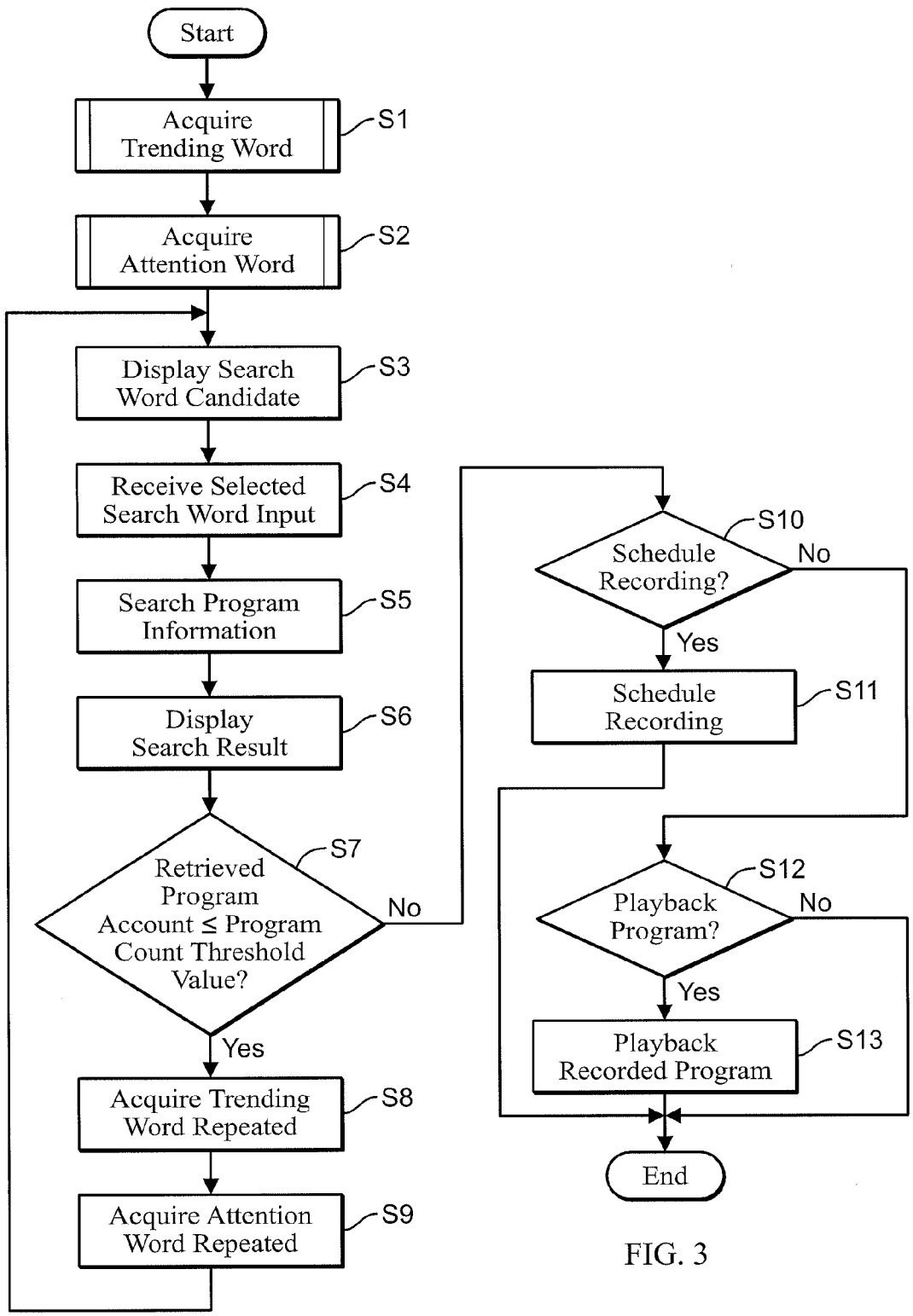
FIG. 3 is a flowchart illustrating a procedure executed by the video recording/playing device.

FIG. 3 is a flowchart illustrating a procedure executed by the video recording/playing device 100 according to one or more embodiments.

The trending word acquiring portion 106 acquires, from the Internet 300, trending words, which are words wherein the numbers of searches on a search engine are increasing (S1). For example, the trending word acquiring portion 106 acquires, from a search engine, trending words, which are words wherein the number of searches on that search engine has increased relative to a specific interval in the past.

FIG. 4 is a detailed flowchart for the trending word acquiring procedure (S1 in FIG. 3) according to one or more embodiments.

The trending word acquiring portion 106 connects, following a communication protocol such as TCP/IP (Transmission Control Protocol/Internet Protocol), to a server of a search engine that provides an information searching service on the Internet 300 (S21).

The trending word acquiring portion 106 acquires trending words from the search engine (S22). The trending words are, for example, words that appear frequently in queries that are inputted into the search engine by users of the search engine, or words having a large rate of increase, in respect to time, of the appearance frequency thereof. Such trending words are provided to the trending word acquiring portion 106 as a service of the search engine. The definition of "trending word" is established by the search engine.

The trending word acquiring portion 106 selects, as search word candidates, the trending words with the top five rankings, from the trending words acquired from the search engine (S23). The ranking is determined based on the search frequency or on the rate of increase of the search frequency. FIG. 5 is a diagram illustrating one example of five selected trending words. For example, trending words such as "Marmoset," "London Olympics," "Typhoon No. 14," "Nippon Party," and "Presidential Election," are selected. While in some cases it is possible to acquire an explanation of the trending words, as illustrated in FIG. 5, as well, when acquiring the trending words, the explanations for the trending words need not necessarily be acquired. Acquiring the explanations of the trending words and displaying the explanations of the trending words on the screen of the television 200 together with the search word candidates makes it possible for the user to understand the meanings of the search word candidates.

Returning again to FIG. 3, the attention word acquiring portion 108 extracts words from the electronic program guide 121 that is stored in the program information database 104, and, from those, acquires, as attention words, words wherein the appearance frequencies in a second period, which follows a first period, have increased beyond the appearance frequencies in the period (S2).

Figure 6:
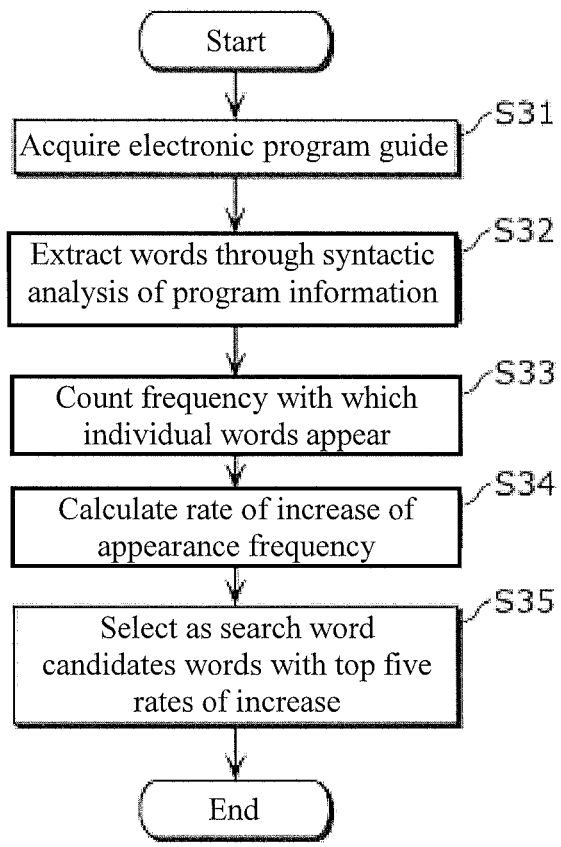
FIG. 6 is a detailed flowchart for the attention word acquiring procedure (S2 in FIG. 3).

FIG. 6 is a detailed flowchart for the attention word acquiring procedure (S2 in FIG. 3) according to one or more embodiments.

The attention word acquiring portion 108 acquires, from the program information database 104, the electronic program guide 121 received for by the television tuner 102 from a broadcast (S31). FIG. 7 is a diagram illustrating one example of an electronic program guide 121. The electronic program guide 121 is program information that stores a program ID, program name, channel, broadcast date and time, and a program description. The program description includes detail about the program, the genre thereof, and the actors that appear therein. However, the structure of the electronic program guide 121 is one example, and it is not limited to the example illustrated in FIG. 7, but may include other information as well, or a portion of this information may be absent. The recorded program information 122 that is stored in the program information database 104 has a data structure identical to that of the electronic program guide 121.

The attention word acquiring portion 108 extracts words through an analysis of the program information for the individual programs included in the electronic program guide 121 (S32). For example, "Politics," "Nippon Party," "Presidential Election," and "Press Conference," and the like, are extracted from the program information for the program of ID "P1" of the electronic program guide 121 illustrated in FIG. 7. The word extraction is performed using, for example, a well-known morphological analysis technique. The attention word acquiring portion 108 extracts words from the "Program Name" and "Program Description" in the program information, but does not extract words from the "Program ID," "Channel," or "Broadcast Date and Time." This makes it possible to exclude words that are not of interest to the user.

The attention word acquiring portion 108 counts the appearance frequencies of words respectively in a first period and a second period (S33). The first period and the second period may be specific single days, or may be multiple days. For example, the second period may be the present day and the first period may be the day before. Conversely, the second period may be a seven-day period from the present day until seven days thereafter, and the first period may be a seven-day period from seven days in the past until the previous day. FIG. 8 is a diagram illustrating one example of appearance frequencies of words that are counted according to one or more embodiments. For each word that appears, the word appearance frequency in the program information for which the broadcast date and time is included in the first period (the first period appearance frequency) and the word appearance frequency in the program information for which the broadcast date and time is included in the second period (the second period appearance frequency) are displayed. For example, for the word "Nippon Party," it can be seen that this word appears twice in the program information in the first period and appears six times in the program information in the second period.

The attention word acquiring portion 108 calculates the rate of increase of the appearance frequency of the word for each individual word that is extracted (S34). The rate of increase of the appearance frequency is calculated through Equation 1, below:

$$\text{Rate of increase in appearance frequency (\%)} = (\text{Period 2 appearance frequency} - \text{Period 1 appearance frequency})/\text{Period 1 appearance frequency} \times 100 \quad \text{(Equation 1)}$$

However, if the period 1 appearance frequency is 0, the rate of increase in the appearance frequency (%) is defined as 0.

FIG. 8 shows one example of appearance frequencies according to one or more embodiments. For the word "Presidential Election," the period 1 appearance frequency is "2" and the period 2 appearance frequency is "10," and thus, applying these numeric values to Equation 1, above, the rate of increase of the appearance frequency is calculated as 400%.

The attention word acquiring portion 108 selects, from the extracted words, the five words with the largest appearance frequency rates of increase, and uses the 5 selected by attention words as search word candidates (S35). For example, of the words shown in FIG. 8, when the five words with the highest appearance frequency rates of increase are selected, the 5 attention words shown in FIG. 9 are selected as search word candidates.

Figure 10:
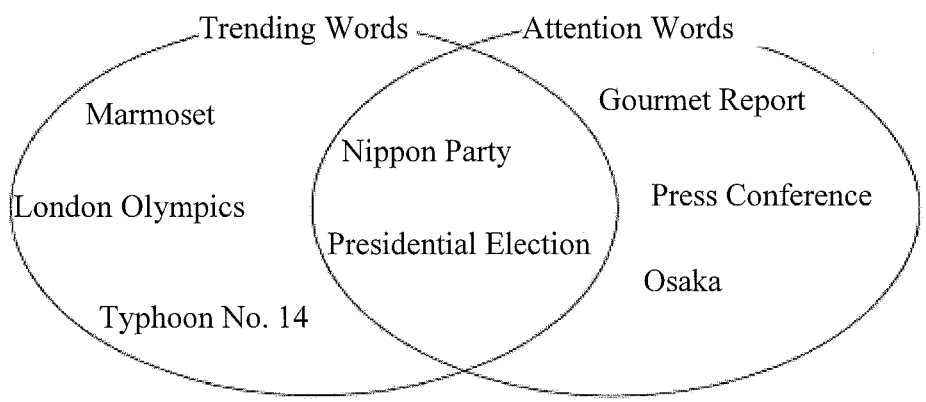
FIG. 10 is a diagram illustrating the inclusion relationships of the trending words, obtained by the trending word acquiring portion in the trending word acquiring procedure (S1 in FIG. 2), and the attention words, acquired by the attention word acquiring portion in the attention word acquiring procedure (S2 in FIG. 2).

Returning again to FIG. 3, the search word selecting portion 110 displays, on the screen of the television 200, as search word candidates, the trending words acquired by the trending word acquiring portion 106. Moreover, the search word selecting portion 110 displays, on the screen of the television 200, as search word candidates, the attention words acquired by the attention word acquiring portion 108 (S3). FIG. 10 is a diagram according to one or more embodiments illustrating the inclusion relationships of the trending words, obtained by the trending word acquiring portion 106 in the trending word acquiring procedure (S1 in FIG. 2), and the attention words, acquired by the attention word acquiring portion 108 in the attention word acquiring procedure (S2 in FIG. 2). As illustrated in FIG. 10, five words are acquired as trending words and five words are acquired as attention words. Of these, the words "Nippon Party" and "Presidential Election" are words that are found in both the trending words and the attention words. Because of this, eight words are acquired as search word candidates.

Figure 11:
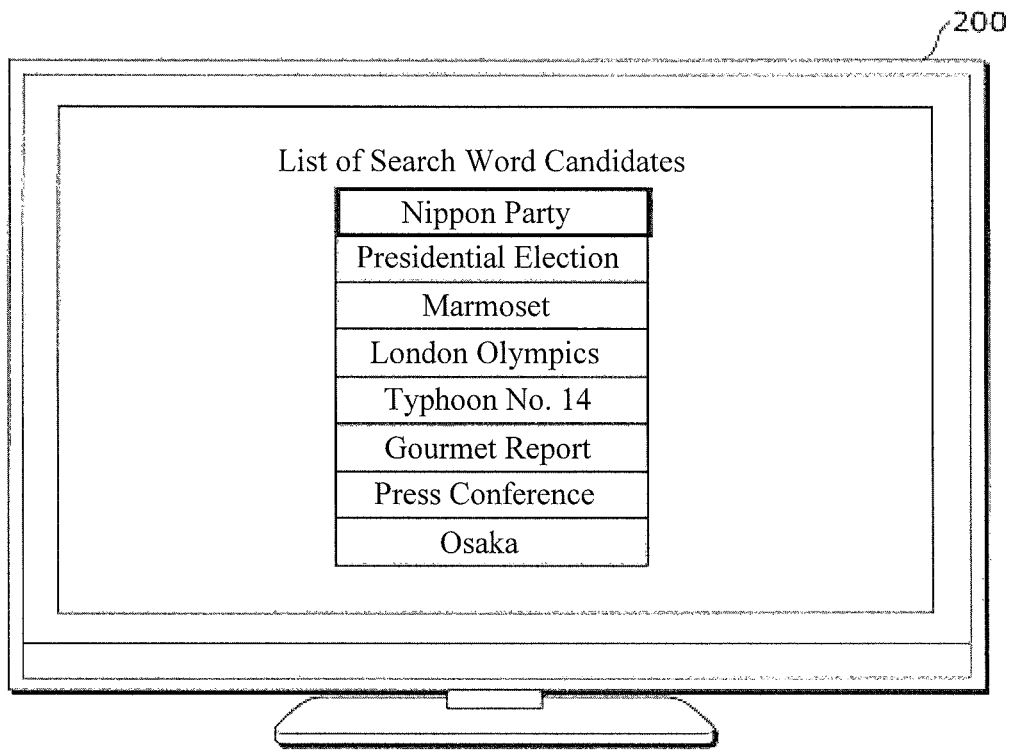
FIG. 11 is a diagram illustrating an example display, on a television screen, for eight words acquired as search word candidates.

FIG. 11 is a diagram according to one or more embodiments illustrating an example display, on the screen of the television 200, of the eight words acquired as search word candidates. As illustrated in this figure, "Nippon Party" and "Presidential Election," which are the words found in both the trending words and the attention words, for example, may be displayed at the top. These words that are found in both are both topics of current popular interest and are words that are of attention to the program producers, so can be considered to be of words of high interest to the users. Because of this, by displaying these words found in both at the top they can be selected efficiently as search words by the user. Moreover, because, between the trending words and the attention words, it is the trending words that can be considered to reflect the topics of current popular interest, the trending words are displayed further toward the top. Doing so enables the search words to be selected efficiently by the user.

The search word selecting portion 110 receives a search word selection input from the user from among the search word candidates that are displayed on the screen of the television 200 (S4). For example, the user performs an operation with a remote controller to input a selection of "Nippon Party," from among the eight search words displayed on the screen of the television 200, illustrated in FIG. 11, by moving the cursor to the position of the "Nippon Party," and pressing a confirmation key.

The program information searching portion 112 searches the program information database 104, which stores the electronic program guide 121 or the recorded program information 122, for program information that includes the search word selected by the user. It is set in advance whether the program information searching portion 112 is to search the electronic program guide 121 or the recorded program information 122. If the user wishes to use the program video recording/playing device 100 for the purpose of scheduling recording of a program, then the program information searching portion 112 will search the electronic program guide 121. If the user uses the video recording/playing device 100 for the purpose of playing a program that has already been recorded, then the program information searching portion 112 searches the recorded program information 122.

Figure 12:
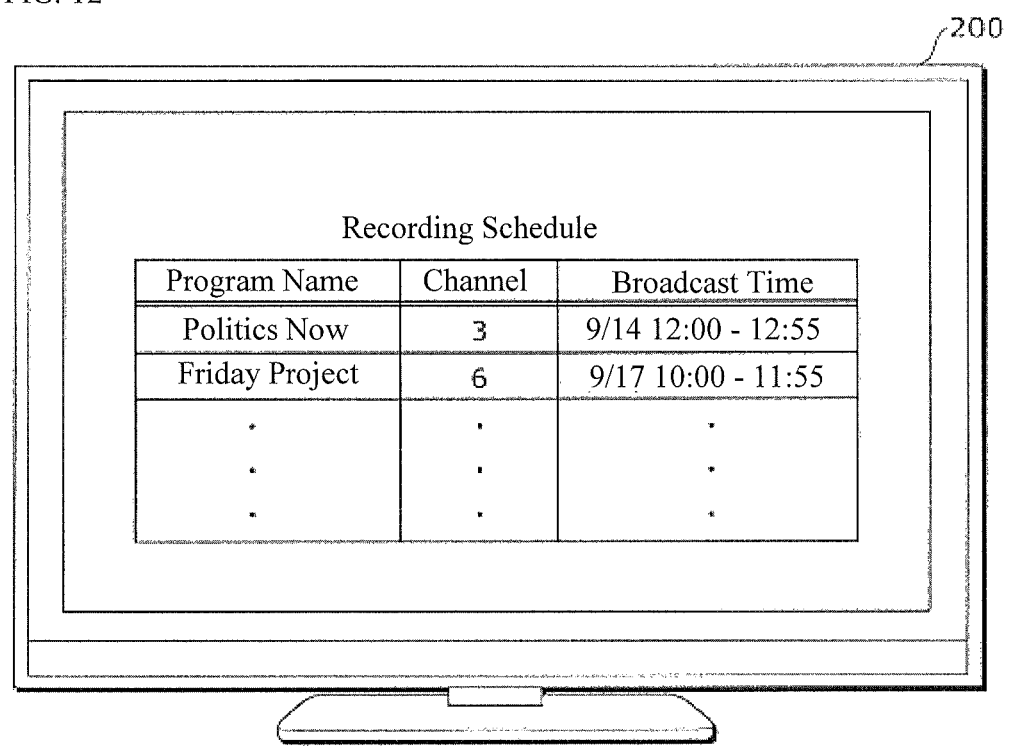
FIG. 12 is a diagram illustrating one example of program information retrieved from the electronic program guide by the program information searching portion.

The search result displaying portion 114 displays, on the screen of the television 200, the program information retrieved by the program information searching portion 112 (S6). FIG. 12 is a diagram according to one or more embodiments illustrating one example of program information retrieved from the electronic program guide 121 by the program information searching portion 112. If the current date is September 14, then program information for programs to be broadcasted on September 14 or beyond will be displayed on the screen.

Figure 13:
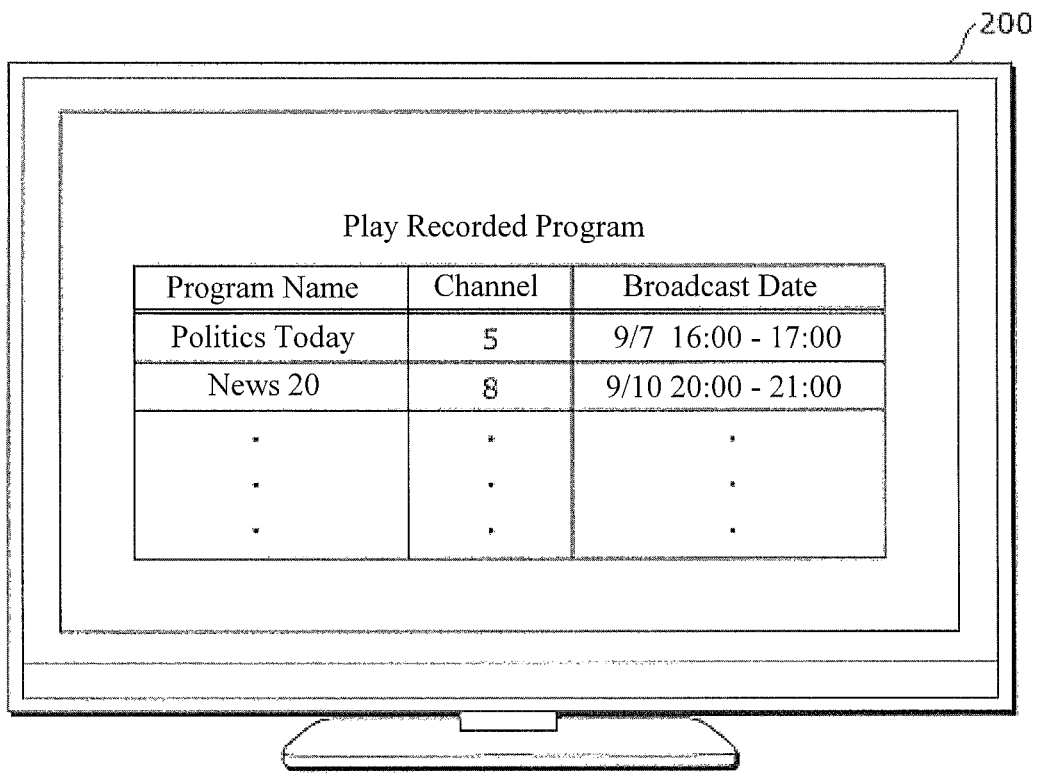
FIG. 13 is a diagram illustrating one example of program information retrieved from the recorded program information by the program information searching portion.

On the other hand, FIG. 13 is a diagram according to one or more embodiments illustrating one example of program information retrieved from the recorded program information 122 by the program information searching portion 112. Program information for programs that have already been recorded will be displayed on the screen.

In this way, the procedure for searching the program information (S3 through S6) is executed repeatedly until a program desired by the user is obtained. Note, however, that if the number of program information retrieved using any of the search key words is no more than a program account threshold value, that is, if the number of programs retrieved is no more than a specific program count threshold value (S7: YES), then the trending word acquiring portion 106 acquires again, from a search engine that provides an information searching service on the Internet 300, trending words that are words for which the search frequencies are rising (S8). Moreover, the attention word acquiring portion 108 acquires attention words again from the electronic program guide 121 that is stored in the program information database 104 (S9). This program count threshold value may be 0, or it may be a value of 1 or more.

Figure 14:
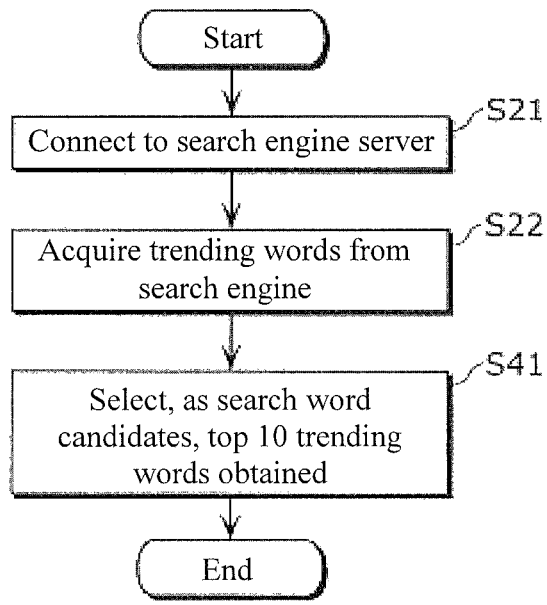
FIG. 14 is a detailed flowchart of the trending word repeated acquiring procedure (S8 in FIG. 2)

FIG. 14 is a detailed flowchart of the trending word repeated acquiring procedure (S8 in FIG. 2) according to one or more embodiments. The procedures in S21 and S22 are identical to the procedures in S21 and S22 of FIG. 4, so the detailed explanations thereof will not be repeated here. The trending word acquiring portion 106 selects, as search word candidates, the trending words with the top 10 rankings, from the trending words acquired from the search engine (S41). The ranking is determined based on the search frequency or on the rate of increase of the search frequency, in the same manner as in the procedure in S23 of FIG. 4.

FIG. 15 is a diagram according to one or more embodiments illustrating one example of a selected portion from 10 trending words. In contrast to the selection of five search word candidates in the procedure in S23, illustrated in FIG. 4, the difference here is that 10 search word candidates are selected in the procedure in S41.

Figure 17:
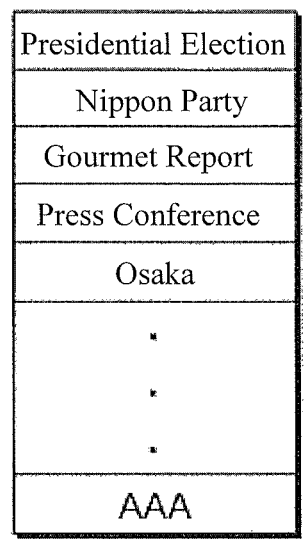
FIG. 17 is a diagram illustrating an example of 10 selected attention words, as search word candidates.

FIG. 16 is a detailed flowchart for the attention word repeated acquiring procedure (S9 in FIG. 2) according to one or more embodiments. The procedures in S31 through S34 are identical to the procedures in S31 through S34 of FIG. 6, so the detailed explanations thereof will not be repeated here. The attention word acquiring portion 108 selects, from the extracted words, the 10 words with the largest appearance frequency rates of increase, and uses the 10 selected by attention words as search word candidates (S51). For example, of the words shown in FIG. 8, when the 10 words with the highest appearance frequency rates of increase are selected, the 10 attention words shown in FIG. 17 are selected as search word candidates. Some of the positions for the 10 words are omitted. In contrast to the selection of five search word candidates in the procedure in S35, illustrated in FIG. 6, the difference here is that 10 search word candidates are selected in the procedure in S51.

Returning again to FIG. 3, the procedures starting with S3 are executed regarding the search word candidates obtained through the trending word repeated acquiring procedure (S8 in FIG. 2) and the attention word repeated acquiring procedure (S9 in FIG. 2).

If the number of program information retrieved is larger than the program count threshold value (S7: No) than a display such as shown in FIG. 12 or FIG. 13, described above, is produced on the screen of the television 200, and if the user operates the remote controller of the television 200 on the screen illustrated in FIG. 12 to select one of the program information (S10: Yes), then the recording scheduling portion 116 schedules recording of the program of the selected program information (S11). Moreover, when the user operates the remote controller of the television 200 to select any of the program information on the screen illustrated in FIG. 13 (S12: Yes), then the program playing portion 118 plays the program of the selected program information (S13).

As described above, in the present embodiment, program information is retrieved based on a trending word acquired from a search engine. A "trending" word is a word with a high search frequency or a word where in the rate of increase, with respect to time, of the search frequency is high. Because of this, a trending word indicates information that is of current popular interest. Consequently, searching for program information based on trending words enables accurate and efficient retrieval of programs that deal with information regarding topics of current popular interest.

Moreover, a program can be retrieved through the use of an attention word, which is a word for which the frequency of appearance thereof in the electronic program guide is increasing over time. While attention words can be considered to reflect information that is given attention by the program producers, the use of attention words as supplementary words for trending words enables accurate and efficient retrieval of programs that deal with information regarding topics of current popular interest. For example, this enables accurate and efficient retrieval of programs that, although not of much interest during a first period, suddenly are of interest in a second period.

Moreover, the search word candidates are both the trending words and the attention words. That is, words that, although not included in the trending words, are included in the attention words can be presented to the user as search word candidates. Just because a word is a trending word does not necessarily mean that there is a program that is broadcasted pertaining thereto. Because of this, the supplemental use of attention words enables accurate and efficient retrieval of programs that deal with information regarding topics of current popular interest, while preventing omission of search words.

Moreover, if there are no programs dealing with the contents of the search words, then the trending word repeated acquiring procedure (S8 in FIG. 3) or the attention word repeated acquiring procedure (S9 in FIG. 3) can be executed to increase the number of search word candidates. As a result, it is possible to prevent the omission of retrieval of programs dealing with topics of current popular interest through enabling the selection of search words by the user.

Moreover, the searching for program information that includes the search word may be performed not just on the program names, but on the program descriptions as well.

The present invention is not limited to a video recording/playing device as explained above.

Figure 18:
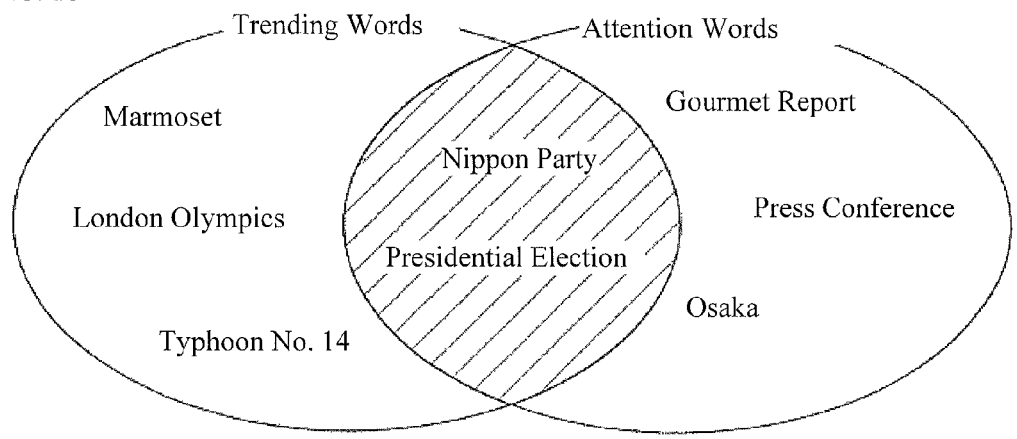
FIG. 18 is a diagram illustrating the inclusion relationships of the trending words, obtained by the trending word acquiring portion in the trending word acquiring procedure (S1 in FIG. 2), and the attention words, acquired by the attention word acquiring portion in the attention word acquiring procedure (S2 in FIG. 2).

For example, while, in the search word candidate displaying procedure (S3) the search word selecting portion 110 displayed, as search word candidates on the screen of the television 200 both the trending words, obtained by the trending word acquiring portion 106, and the attention words obtained by the attention word acquiring portion 108, the search word candidates that are displayed are not limited thereto. For example, the search word selecting portion 110 may display, as search word candidates on the screen of the television 200, those words that are included in both the trending words, obtained by the trending word acquiring portion 106, and the attention words obtained by the attention word acquiring portion 108. FIG. 18 is a diagram illustrating the inclusion relationships of the trending words, obtained by the trending word acquiring portion 106 in the trending word acquiring procedure (S1 in FIG. 2), and the attention words, acquired by the attention word acquiring portion 108 in the attention word acquiring procedure (S2 in FIG. 2). As illustrated in FIG. 18, "Nippon Party and "Presidential Election," which are the words that are included in common in both the trending words and the attention words, may be displayed on the screen of the television as search word candidates. Providing, to the user, search word candidates that consider the words that are paid attention to by program producers in this way, enables an increase in the probability that a program will be found when performing a program search. This enables accurate and efficient retrieval of programs that deal with information regarding topics of current popular interest.

Moreover, "Marmoset," "London Olympics," and "Typhoon No. 14," which are attention words that were excluded from the trending words, may be displayed on the screen of the television 200 as search word candidates. Because of attention words can be considered to reflect the interests of the program producers, the interests of the program producers may be removed intentionally by determining the search word candidates in this way.

Figure 19:
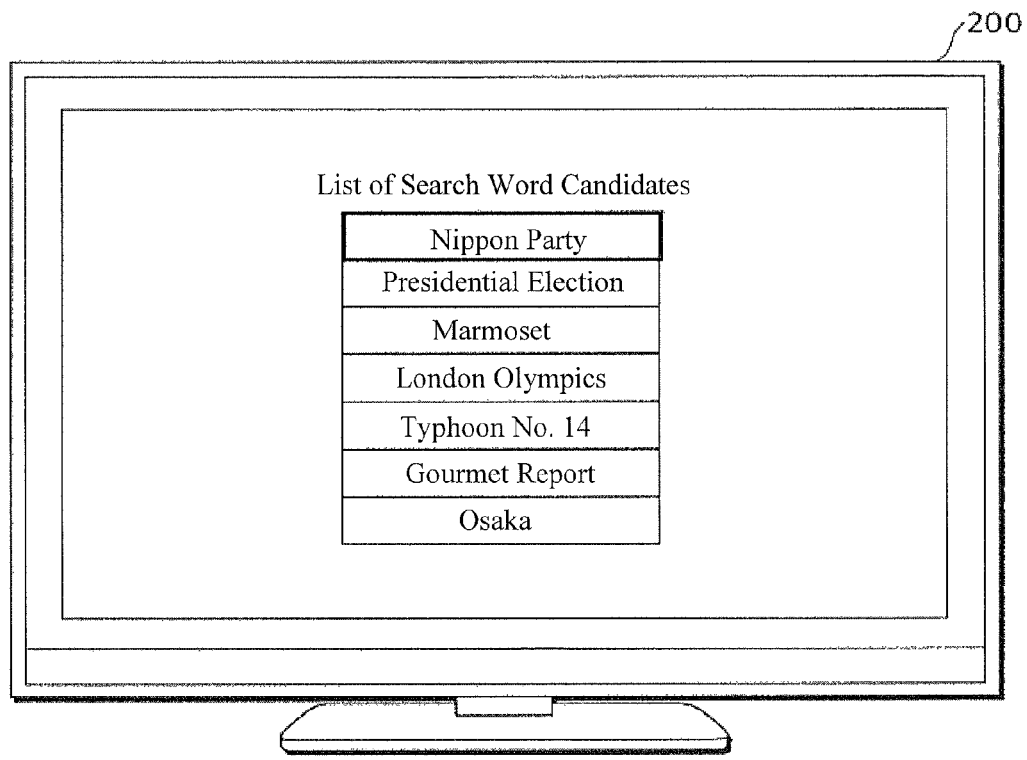
FIG. 19 is a diagram illustrating an example display of search word candidates that excludes specific or predetermined words.

Moreover, in the search word candidate displaying procedure (S3), the search word selecting portion 110 may display on the screen of the television 200 search word candidates wherein specific words have been excluded from the trending words and attention words. For example, "Press Conference" may be set in advance as a specific word. In one or more embodiments, as illustrated in FIG. 19, search word candidates other than "Press Conference" will be displayed. For example, because a news program is a program that is broadcasted every day, when "news" is included in the search words, a variety of news programs will be retrieved. However, such words cannot really be considered to be topics of current popular interest. Because of this, it is possible to provide to the user search word candidates of high current popular interest through excluding, as specific words, words that appear frequently in program information such as "news," "starring," "information," "press conference," and the like, from the search word candidates. This enables accurate and efficient retrieval of programs that deal with information regarding topics of current popular interest.

Moreover, while in the embodiments set forth above program information was retrieved for program recording scheduling or playing a recorded program, program information may be retrieved for other purposes as well. For example, program information may be retrieved in order to schedule program viewing.

Moreover, the programs that are subject to searching by the video recording/playing device 100 are not limited to television programs, but maybe radio programs instead. Moreover, there is no limitation to broadcast programs, but instead may be programs that are distributed via a network, such as on-demand distribution, real-time distribution, streaming distribution, or the like.

Moreover, while in the embodiments set forth above the video recording/playing device 100 was a hard disk recorder or a BD recorder, or the like, there is no limitation thereto. For example, the function for program searching provided in the video recording/playing device 100 may be provided separately from the program video recording/playing device 100. That is, the present invention may be embodied as a specialized device for searching programs that are recorded on a recording/playback device for searching for programs that are scheduled to be broadcasted in the future. Moreover, the video recording/playing device 100 may be a television that is provided with a video recording/playing function.

Figure 20:
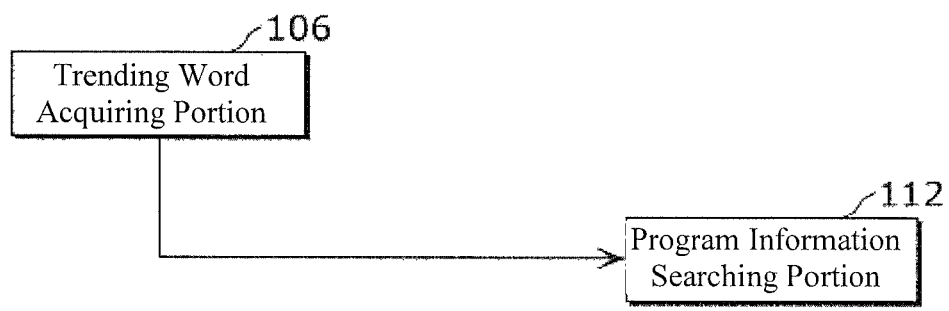
FIG. 20 is a block diagram illustrating a structure for a video recording/playing device provided with structural elements in one or more embodiments of the present invention.
Figure 21:
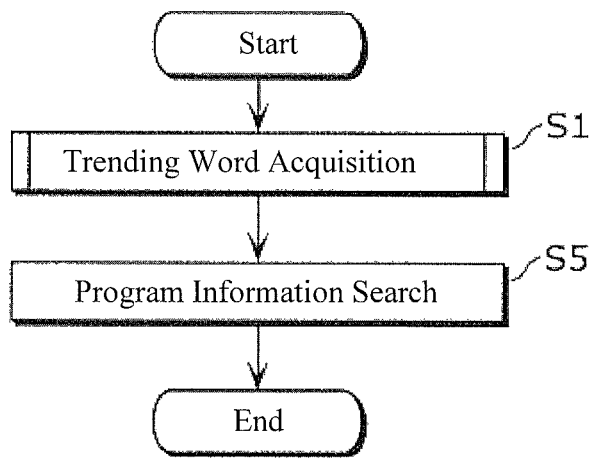
FIG. 21 is a flowchart illustrating procedures executed by the video recording/playing device according to one or more embodiments.

FIG. 20 is a block diagram illustrating a structure for a video recording/playing device 100 according to one or more embodiments. That is, the video recording/playing device 100 may have the program information database 104, the trending word acquiring portion 106, and the program information searching portion 112, where the other structures need not necessarily be provided. FIG. 21 is a flowchart illustrating procedures executed by the video recording/playing device 100 according to one or more embodiments. The video recording/playback device 100 need only execute, as a minimum limit, the procedures in S1 through S5, in the procedures executed by the video recording/playing device 100 in FIG. 3, where the other procedures need not necessarily be executed.

Moreover, the individual devices set forth above, specifically, may be structured from a computer that is structured from a microprocessor, a ROM, a RAM, a hard disk drive, a display unit, a keyboard, a mouse, and the like. A computer program is stored in the RAM or the hard disk drive. The individual devices achieve the functions through a microprocessor operating in accordance with the computer program. Here the computer program is structured combining a plurality of individual command codes, which indicate commands to the computer, for achieving the specific functions.

Moreover, some or all of the structural elements that structure the individual devices set forth above may be structured from a single system LSI (Large Scale Integration) chip. A system LSI circuit is an ultra-multifunctional LSI circuit structured through integrating a large number of structural portions into a single chip, and, specifically, is a computer system that is structured including a microprocessor, a ROM, a RAM, and the like. A computer program is stored in the RAM. The microprocessor operating in accordance with the computer program causes the system LSI chip to achieve the functions.

Moreover, some or all of the structural elements that structure the individual devices set forth above may be structured from an IC card or independent module that can be attached removably to the individual devices. The IC card or module is a computer system that is structured from a microprocessor, a ROM, a RAM, and the like. The IC card or module may include the aforementioned ultra-multifunctional LSI chip. The microprocessor operating in accordance with the computer program causes the IC card or module to achieve the functions. The IC card or module may have an anti-tamper function.

Moreover, one or more embodiments of the present invention may be as the method described above. Moreover, one or more embodiments of the present invention may be as a computer program for embodying this method through a computer, or may be as a digital signal from the computer program.

Furthermore, one or more embodiments of the present invention may be as the aforementioned computer program or the aforementioned digital signal recorded on a computer-readable non-volatile storage medium such as, for example, a flexible disk, a hard disk, a CD-ROM, an MO, a DVD ROM, a DVD RAM, a BD (Blu-ray Disc™) a semiconductor memory, or the like. Moreover, it may be as the aforementioned digital signal that is recorded on the non-volatile storage medium.

Moreover, one or more embodiments of the present invention may be as that which transmits the aforementioned computer program or digital signal through an electronic communication circuit, a wireless or wired communication circuit, a network such as the Internet, data broadcasting, or the like.

Moreover, one or more embodiments of the present invention may be a computer system that is provided with a microprocessor and memory, where the memory stores the aforementioned computer program and the microprocessor operates in accordance with the aforementioned computer program.

Moreover, one or more embodiments of the present invention may be executed on another independent computer system to transfer of the aforementioned program or the aforementioned digital signal through recording onto the non-volatile storage medium, or through transfer of the aforementioned program or the aforementioned digital signal through the aforementioned network, or the like.

Furthermore, various combinations of the embodiments set forth above and the modified examples thereof set forth above are possible.

[Potential for Use in Industry]

One or more embodiments of the present invention can be applied to a video recording/playing device, and, in particular, can be applied to a video recording/playing device for retrieving a recorded program and to a television, or the like, for scheduling a program to be viewed by a user.

While the invention has been described with respect to a limited number of embodiments, those skilled in the art, having benefit of this disclosure, will appreciate that other embodiments can be devised which do not depart from the scope of the invention as disclosed herein. Furthermore, those of ordinary skill in the art would appreciate that certain components or "portions" of one or more embodiments of the present invention may be implemented by a circuit, processor, etc. using known methods. Accordingly, the scope of the invention should be limited only by the attached claims.

EXPLANATION OF CODES

100: Video Recording/Playing Device
102: Television Tuner
104: Program Information Database
106: Trending Word Acquiring Portion
108: Attention Word Acquiring Portion
110: Search Word Selecting Portion
112: Program Information Searching Portion
114: Search Result Displaying Portion
116: Recording Scheduling Portion
118: Program Playing Portion
121: Electronic Program Guide
122: Recorded Program Information 150: Cable
200: Television
300: Internet

What is claimed is:

1. A video recording/playing device comprising:
a memory that comprises a program information database that stores:
an electronic program guide that includes program information about programs that are currently broadcasted or scheduled to be broadcasted, and
recorded program information that includes program information about recorded programs; and
a processor that:
acquires, from the Internet, a trending word for which a search frequency is rising;
retrieves from the program information database program information that includes the trending word;
schedules a recording of a program having the program information that includes the trending word when the processor retrieves the program information that includes the trending word from the electronic program guide; and
plays the program having the program information that includes the trending word when the processor retrieves the program information that includes the trending word from the recorded program information.

2. The video recording/playing device as set forth in claim 1, wherein
the processor acquires a specific number of trending words, from those having high rankings, from the Internet.

3. The video recording/playing device as set forth in claim 1, wherein the processor:
displays on a screen, as a search word candidate, the acquired trending word, and receives a selection input of a search word from a user, and
retrieves from the program information database program information that includes the search word selected by the user.

4. The video recording/playing device as set forth in claim 1, wherein the processor:
extracts words from the electronic program guide and acquires, as an attention word, a word for which an appearance frequency in a second period, following a first period, has increased beyond the appearance frequency in the first period,
displays on a screen, as a search word candidate, a word obtained by causing the acquired attention word to operate on the acquired trending word, and receives a selection input for a search word by the user, and
retrieves from the program information database program information that includes the search word selected by the user.

5. The video recording/playing device as set forth in claim 4, wherein
the processor acquires, as an attention word, from among the words extracted from the electronic program guide, a word having a rate of increase in an appearance frequency over an interval from the first period to the second period, relative to the appearance frequency in the first period, is no less than a specific threshold value, or a specific number of words in which the rate is large.

6. The video recording/playing device as set forth in claim 4, wherein
the processor displays on the screen, as a search word candidate, a word that is included in both the acquired trending word and the acquired attention word.

7. The video recording/playing device as set forth in claim 4, wherein
the processor displays on the screen, as search word candidates, the acquired trending word and the acquired attention word.

8. The video recording/playing device as set forth in claim 4, wherein
the processor displays on the screen, as search word candidates, words wherein the acquired attention word has been excluded from the acquired trending word.

9. The video recording/playing device as set forth in claim 4, wherein
the processor displays, on the screen, the search word candidates, not including a predetermined word.

10. The video recording/playing device as set forth in claim 3, wherein
the processor increases the number of search word candidates by increasing a number of acquired trending words if the number of retrieved program information is no more than a specific program count threshold.

11. The video recording/playing device as set forth in claim 5, wherein
the processor increases the number of search word candidates by increasing a number of acquired attention words and by decreasing the specific threshold value or by increasing the specific number, if the number of retrieved program information is no more than a specific program count threshold.

12. The video recording/playing device as set forth in claim 1, wherein
the program information includes a program name and a description of a program.

13. A method for retrieving a program by a computer, comprising:
acquiring, from the Internet, a trending word for which a search frequency is rising;
retrieving from a program information database program information that includes the trending word, the program information database storing:
an electronic program guide that includes program information about programs that are currently broadcasted or scheduled to be broadcasted, and
recorded program information that includes program information about recorded programs;
scheduling a recording of a program having the program information that includes the trending word when the program information that includes the trending word is retrieved from the electronic program guide; and
playing the program having the program information that includes the trending word when the program information that includes the trending word is retrieved from the recorded program information.

14. The method as set forth in claim 13, wherein
the acquiring includes acquiring a specific number of trending words, from those having high rankings, from the Internet.

15. The method as set forth in claim 13, further comprising:
displaying on a screen, as a search word candidate, the acquired trending word;
receiving a selection input of a search word from a user; and
retrieving from the program information database program information that includes the search word selected by the user.

16. The method as set forth in claim 13, further comprising:
extracting words from the electronic program guide and acquiring, as an attention word, a word for which an appearance frequency in a second period, following a first period, has increased beyond the appearance frequency in the first period;

displaying on a screen, as a search word candidate, a word obtained by causing the acquired attention word to operate on the acquired trending word;

receiving a selection input for a search word by the user; and retrieving from the program information database program information that includes the search word selected by the user.

17. The method as set forth in claim 16, further comprising: acquiring, as an attention word, from among the words extracted from the electronic program guide, a word having a rate of increase in an appearance frequency over an interval from the first period to the second period, relative to the appearance frequency in the first period, is no less than a specific threshold value, or a specific number of words in which the rate is large.

18. The method as set forth in claim 16, further comprising: displaying on the screen, as a search word candidate, a word that is included in both the acquired trending word and the acquired attention word.

19. The method as set forth in claim 16, further comprising: displaying on the screen, as search word candidates, the acquired trending word and the acquired attention word.

20. The method as set forth in claim 16, further comprising: displaying on the screen, as search word candidates, words wherein the acquired attention word has been excluded from the acquired trending word.

* * * * *